Patented July 1, 1941

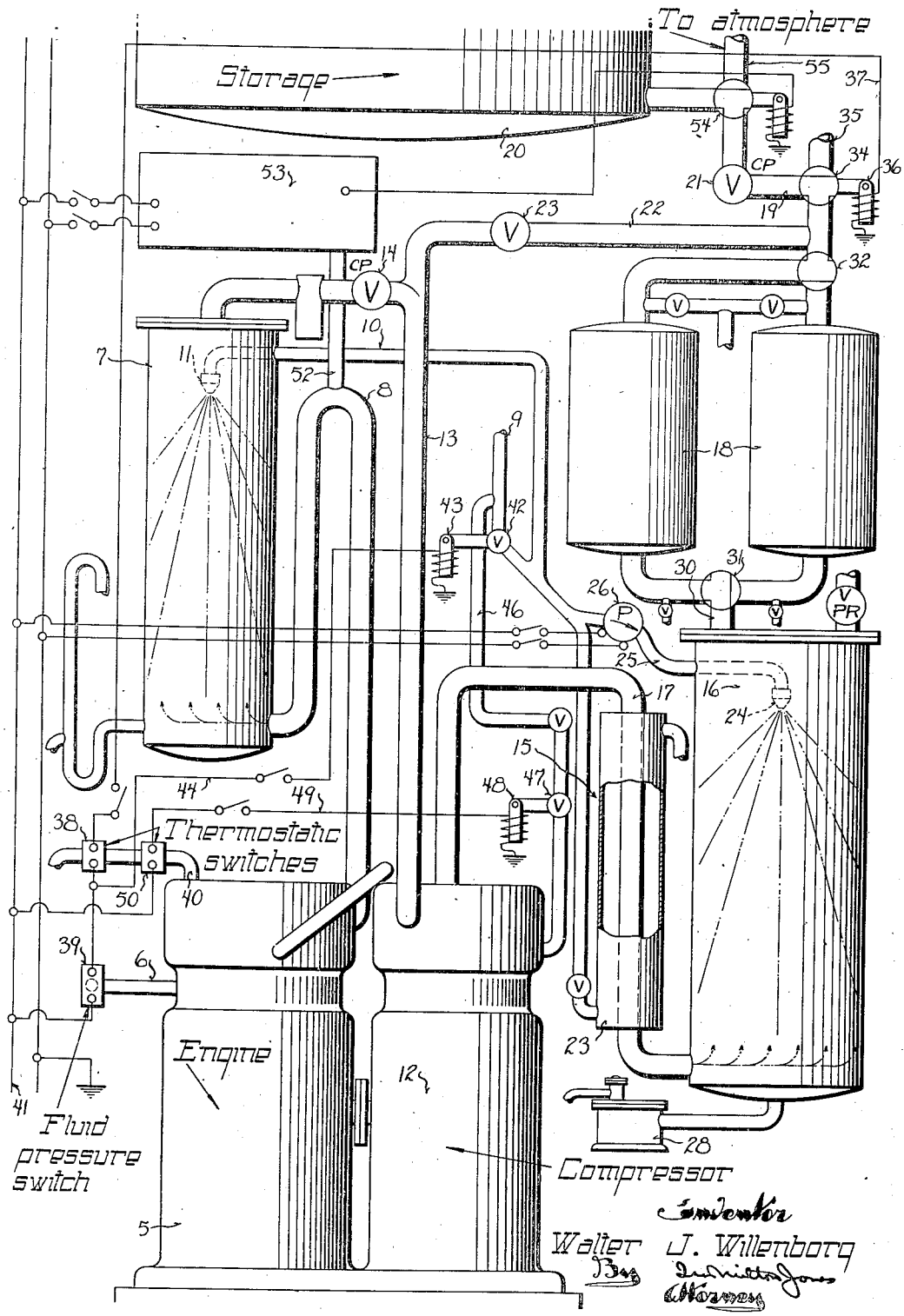

2,247,625

UNITED STATES PATENT OFFICE 2,247,625

PRODUCTION OF INERT GAS

Walter J. Willenborg, Weehawken, N. J., assignor to Charles L. Coughlin, Milwaukee, Wis.

Continuation of application Serial No. 77,742, May 4, 1936. This application January 5, 1940, Serial No. 312,509

6 Claims. (Cl. 252—372)

This application is a continuation of the copending application of Walter J. Willenborg, Serial No. 77,742, filed May 4, 1936, for Removal of nitrogen oxides in inert gas producers.

The invention presented herein relates to gas producers and refers more particularly to improvements in the method of and the apparatus for producing inert gas from gaseous combustion products.

In present day practice, inert gas is produced in a number of different manners, the most successful of which are probably those methods which utilize the combustion gases from chambers fired by oil, manufactured, natural or liquefied petroleum gases, gasolene or coke, or stack gases and exhaust gases derived from internal combustion engines.

The deterioration of equipment handling inert gases obtained from all of these sources and especially from exhaust gases of internal combustion engines, however, makes these sources of inert gas objectionable due to the presence of nitrogen oxides in the gases.

The higher nitrogen oxides particularly exercise a deleterious effect on the metal of handling equipment or storage vessels; but inasmuch as the proportion of these harmful nitrogen oxides in the exhaust gases represents only a very minute proportion of the exhaust or combustion gases, they have not been identified in the past as the cause of trouble.

Inasmuch as conventional inert gas producers employ cleaners for purifying the combustion gases, it was apparently presumed that any harmful nitrogen oxides contained in the gases would be removed during cleaning. This is only partly true, however; for while the higher nitrogen oxides, and particularly nitrogen peroxide, are readily soluble in water and may be removed from exhaust gases by a scrubbing operation, quantities of lower nitrogen oxides also were present and could not be removed by scrubbing, as they are insoluble in water.

Consequently, the failure of present day inert gas producing apparatus to remove the water insoluble nitrogen oxides from combustion gases results in the production of an inert gas which is objectionable; for when allowed to stand for periods of time, the nitrogen oxides in the inert gas combine with traces of oxygen normally present to form the undesirable nitrogen peroxide, which is destructive when it combines with moisture and is converted into nitrous or nitric acid.

It is, therefore, an object of the present invention to provide a method for producing inert gas substantially entirely free of nitrogen oxides.

More specifically, it is an object of this invention to provide an apparatus for the production of inert gas from combustion gases wherein nitrogen oxides contained in the gases are quickly oxidized and converted into water soluble nitrogen peroxides so that they may be easily removed from the inert gas thus produced by a scrubbing operation.

Another object of this invention is to provide an apparatus for continuously producing inert gas free of nitrogen oxides from combustion gases.

A further object of this invention is the provision of means in an apparatus of the character described for compressing the combustion gases flowing through the apparatus to effect quick oxidation of the water insoluble nitrogen oxides contained therein so as to form readily removable water soluble nitrogen peroxides.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which the single figure diagrammatically illustrates an apparatus for producing inert gas in accordance with this invention.

Referring now particularly to the accompanying drawing, in which like numerals indicate like parts, the numeral 5 designates an internal combustion engine for producing combustion gases suitable for inert use. It is to be understood, however, that the use of an internal combustion engine is merely illustrative, as combustion gases from other sources have been found satisfactory for inert use.

However, since the exhaust gases of four cycle internal combustion engines contain more nitrogen oxides than most other gaseous combustion products, the following description will be directed to the process used in connection with gases produced from such a source, as it will be obvious that the method is applicable to the treatment of combustion gases from other sources.

The engine is supplied with fuel oil through a supply line 6, and its combustion is preferably adjustable by means not shown so as to produce an exhaust gas having qualities desirable for inert use, and so as to have an oxygen content of substantially one per cent (1%) for a purpose to be hereinafter described. The combustion gases issuing from the engine 5 are conveyed to a preliminary scrubber 7 by means of a pipe line 8 where the gases are washed with water to remove all solid particles and any other undesirable products of combustion which are soluble in water.

For this purpose, the scrubber is supplied with water from a source 9 through a pipe 10 which enters the scrubber near its upper end and has a nozzle 11 arranged to spray water downwardly thereinto.

After the scrubbing operation, the gases are conveyed to a compressor 12, driven by the engine 5 by a pipe line 13. A constant pressure valve 14 in the pipe line 13 maintains a predetermined constant pressure on the gases in the scrubber and precludes engine load fluctuations caused by vacuum produced by the compressor which has a capacity largely exceeding the volume of the exhaust gases delivered by the engine.

Connected with the outlet of the compressor 12 is a high pressure system indicated generally by the numeral 15 and into which the compressor presses the exhaust gases for treatment. The high pressure system comprises a high pressure scrubber 16 connected with the outlet of the compressor by a conduit 17 and a pair of activated carbon filters 18 interposed between the high pressure scrubber and the delivery conduit 19 through which gas is delivered from the system to storage means 20 or to distribution as required.

The pressure in the high pressure system is maintained continually at a predetermined high degree by means of a constant pressure valve 21 positioned in the delivery conduit 19 between the activated carbon filters 18 and the storage means 20. The setting of the valve 21 is such that it delivers gases from the high pressure system to the storage means at and above a predetermined pressure which is suitable for treating the exhaust gases.

To compensate for the inability of the engine 5 to produce exhaust gases at a rate at which it can be handled by the compressor, a quantity of treated gas, after being passed through the carbon filters 18, is re-introduced into the compressor.

This is accomplished by means of a pipe 22 which connects with the pipe 13 leading to the compressor and which contains a constant pressure valve 23 therein operable to be opened by the action of the compressor. Thus a constant pressure is provided at the compressor intake. This feature, however, is described in detail in Patent No. 2,142,545 issued to Walter J. Willenborg January 3, 1939, and entitled "Pressure actuated control means in systems for generation of inert gases."

As stated, the compressor forces the exhaust gases from the engine into the high pressure system through the conduit 17, and it is in this portion of the high pressure system that the nitrogen oxides contained in small amounts in the gases are oxidized by the free oxygen remaining in the gases to effect conversion of the water insoluble nitrogen oxides to water soluble nitrogen peroxides.

Normally, oxidation of nitrogen oxides NO, to form nitrogen peroxides $NO_2$, is a slow process even when a substantially large amount of oxygen is available; and such oxidation remains slow at all conditions prevailing according to present day standards of inert gas manufacturing. Research discloses, however, that the time required for reaction between the highly diffused nitrogen oxide and oxygen is rapidly decreased as the pressure on the gases increases; the time of reaction being roughly inversely proportional to the cube of the pressure of the gas.

For example, the NO contained in exhaust gas will be fully converted into higher oxides when the gas contains between eight tenths per cent (.8%) and one per cent (1%) of oxygen and is subjected to approximately 180 pounds pressure for the period of a minute and a half.

These proportions, however, are merely illustrative; for with the apparatus of this invention it is possible to convert NO to higher oxides with pressures ranging from 180 pounds per square inch to considerably over 300 pounds per square inch.

It is understood that compressors have been commonly used in past producers of this type; but their function was to provide a load for the engine with which they were coupled so as to produce a higher quality inert gas, and not for the purpose of speeding oxidation of NO by subjecting the exhaust gases to a high pressure.

Inasmuch as the gases flowing through the conduit 17 must be maintained under said substantially high pressure for a period of time necessary for all NO contained in the gases to be converted into $NO_2$; and as the gases flow through the conduit at a substantial velocity due to the pressure, the conduit is provided with a cooler at one portion thereof.

The cooler comprises a water jacket 23 through which water from the source 9, which connects with the pipe 10, is circulated. Thus, the gases flowing through that portion of the conduit which is cooled by the water jacket are correspondingly cooled, which effects a reduction in their volume and reduces their velocity of travel in the conduit 17. The after cooler, therefore, enables a shorter length of conduit between the compressor and the high pressure scrubber 16 than would ordinarily be required to insure sufficient time for oxidation of NO to take place therein.

Upon leaving the conduit 17, the exhaust gases carrying the oxidized nitrogen oxides enter the high pressure scrubber at the bottom thereof to be met by a spray of water issuing from a nozzle 24 fixed to the discharge end of a pipe line 25, connected with the water supply pipe 9.

If desired, a pump 26 may be connected in the pipe line 25 to supply pressure for the water flowing therethrough, and as will be apparent, the impact between the gases entering the scrubber under the high pressure to which they are subjected by the compressor and the water spray, effects a washing out of the gases of all the now soluble higher nitrogen oxides contained therein. The water from the scrubber is drained therefrom by way of a high pressure trap 28 connected with the bottom of the scrubber.

The gases thus purified and free of all harmful nitrogen oxides are discharged from the high pressure scrubber into either of the activated carbon filters 18 through a pipe line 30.

The activated carbon filters are useful for removing any traces of NO not eliminated by the scrubber, as they are of a size to enable additional time for oxidation of NO therein which is then absorbed by the moisture of the activated carbon. The filters also eliminate undesirable odors in the treated inert gas.

A valve 31 in the pipe line between the filters 18 and the high pressure scrubber controls the flow of gases to either of the filters so that the filter not in use may be cleansed and reconditioned while the other remains in operation. Cooperating with the valve 31 is another valve 32 which controls the discharge of gas passing through the filters. Operation of both valves connects either one or the other of the filters in the system.

It is to be noted that the constant pressure valve 21 in the discharge conduit 19 of the system maintains the desired high pressure throughout the entire high pressure system and releases gases at a pressure at or above a predetermined amount which, as stated hereinbefore, may have a range varying from 180 pounds per square inch to well over 300 pounds per square inch. The treated gases thus passed from the high pressure system by the constant pressure valve 21 are received in the storage means 20.

It is a well known fact that exhaust gases from internal combustion engines have a higher quality for inert use when the engine which produces the gases has warmed up to its normal operating temperature. Before the engine reaches this temperature, the exhaust gases produced thereby are undesirable; and for this reason and also to release the compressor load under starting conditions of the engine, a two-way valve 34 in the discharge conduit 19 between the constant pressure valve 21 and the filter valve 32 is provided.

The two-way valve 34 normally permits the gas to discharge from the high pressure system to the atmosphere by way of a conduit 35 and thus relieves the pressure in the high pressure system between the compressor and the valve 21 for the duration of said starting conditions, and is operable to connect the high pressure system with storage means in the manner hereinafter described.

The valve 34 is automatically operated by a solenoid 36 controlled by an electric circuit 37 which contains in series with the solenoid a thermostatic switch 38 and a fluid pressure switch 39. The fluid pressure switch 39 is positioned in the oil feed line of the engine 5 and is closed whenever the engine is in operation and fuel is being fed to the engine. The thermostatic switch 38 is controlled by the temperature of the water issuing from the engine and compressor cooling system through the discharge pipe 40.

During starting conditions, therefore, the two-way valve 34 operates to discharge gases flowing through the system to the atmosphere, inasmuch as the thermostatic switch 38 will not close to complete the circuit until the temperature of the water issuing from the engine cooling system reaches a predetermined degree.

When the engine is sufficiently warmed up, the thermostatic switch 38 closes and completes the circuit from the current supply 41 to the solenoid 36 through the closed fluid pressure switch 39, thus operating the valve 34 to maintain the gases in the system.

The supply of water to the scrubbers 7 and 16 is also controlled by a valve 42 automatically operated by a solenoid 43 connected in series with the fluid pressure switch 39 by a circuit 44. In this manner, the water supply to the scrubbers is shut off immediately upon stopping of the engine.

To facilitate quickly warming up the engine, the water supply pipe 46 leading to the cooling system thereof from the source 9 is provided with a valve 47 automatically operated by a solenoid 48. The solenoid 48 is controlled by an electric circuit 49 which contains in series therewith another thermostatic switch 50 in the water discharge pipe 40.

During starting conditions of the engine, therefore, the thermostatic switch 50 remains open and the circuit to the solenoid 48 is not completed to actuate the valve 47 controlling the supply of cooling water to the compressor and the engine until the temperature of the engine reaches a predetermined degree at which it is suitably warmed up. Closure of the thermostatic switch 50 at this time effects opening of the valve 47 by its solenoid to connect the engine and the compressor with the water supply.

If desired, a qualitative analysis of the exhaust gas issuing from the engine may be made in order to control the delivery of the gases thus produced. For this purpose, a pipe 52 continuously conducts samples of the exhaust gases flowing through the pipe 8 to an analysis board 53, which is connected with the current supply for thermal conductivity measurements of the exhaust gases.

According to the quality of the exhaust gases thus tested for inert use, the analysis board 53 automatically controls a two-way valve 54 in the delivery conduit 19 between the storage means 20 and the constant pressure valve 21 so as to deliver treated gases either to the atmosphere through a conduit 55 or to storage or distribution to the storage means 20.

This feature, however, is fully shown in the Walter J. Willenborg Patents Nos. 1,952,005, issued March 20, 1934, and entitled "Controls for producers of inert gases"; and 2,093,379, issued September 14, 1937, and entitled "Methods of producing combustion inhibiting gas," and forms no part of the present invention.

In order that the method for producing inert gas free of harmful nitrogen oxides may be more fully understood, the operation of the apparatus will be described as follows:

The engine 5 is started and adjusted to produce exhaust gas containing approximately eight tenths per cent (.8%) to one per cent (1%) of oxygen. The exhaust gas thus produced by the engine is delivered to the compressor 12 after being subjected to the scrubbing treatment in the scrubber 7, and is compressed to a pressure ranging from between 180 pounds per square inch to upwards of 300 pounds per square inch, the exact pressure being determined by the setting of the constant pressure valve 21 in the discharge conduit of the system.

During starting conditions, the load on the compressor is released inasmuch as the two-way valve 34 remains open until the engine is warmed up sufficiently to close the thermostatic switch 38.

The water supply to the engine and compressor cooling system is also closed during this period of warming up inasmuch as the thermostatic switch 50 also remains open during starting conditions of the engine.

The water supply to both scrubbers, however, is maintained open as long as the engine is running as the valve 42 controlling the supply of water to the scrubbers and the cooler 23 is actuated upon closure of the fluid pressure switch 39 in the fuel feed line of the engine. Thus, during the warming up period, the compressor will force exhaust gases through the high pressure system 15; and these gases are discharged to the atmosphere through the then open valve 34 and the conduit 35.

Operation of the valve 34, however, in response to the closure of the thermostatic switch 38 effects the discharge of the gas from the high pressure system into the storage means 20.

Inasmuch as the pressure in the entire system 15 is maintained at a uniform high degree in excess of 180 pounds per square inch by the compressor and the constant pressure valve 21, the nitrogen oxide contained in the exhaust gas is quickly oxidized during its passage through the conduit 17 leading from the compressor to the high pressure scrubber 16.

The cooling to which the gases are subjected during their travel through the conduit 17 decreases their velocity and insures sufficient time for full oxidation of all NO in the gases before they reach the high pressure scrubber for elimination by the water treatment.

After the gases are purified by the high pressure scrubber, they enter either one or the other of the activated carbon filters 18. Under certain conditions, where extremely high pressures are used, any additional nitrogen oxide contained in the gases not removed by the high pressure scrubber is removed in either of the filters, which are of a size to afford additional time for reaction of NO to $NO_2$. The moisture of the activated carbon thus removes the last traces of nitrogen oxides under these conditions, besides purifying the gas as to odors, etc.

This is enabled by the fact that the entire system is under the same high pressure and oxidation is possible in any portion thereof.

The purified gases substantially completely free of nitrogen oxides are then discharged to the storage means for distribution as desired.

In instances where fresh water is scarce, a bubble type soda wash scrubber may be effectively used in place of the fresh water spray type high pressure scrubber with equally good results. The soda solution in the scrubber is good for a specific period of time only, and consequently must be changed periodically so as to efficiently remove the higher nitrogen oxides in the gases.

Four cycle engines, which are most commonly used as inert gas producers, heretofore yielded a gaseous product containing between 2500 and 3000 parts of nitrogen oxide to a million parts of inert gas.

Applying the means and method of this invention in the manner hereinabove shown and described, the nitrogen oxide contents may be almost completely eliminated. However, the inert gas produced is satisfactory when it contains not more than three thousandths per cent (.003%) of nitrogen oxides and thus the nitrogen contents of the gas are substantially limited to free nitrogen.

Inert gas produced in accordance with this invention would, therefore, have an analysis where $N_2$ and $CO_2$ would be the primary constituents in quantities substantially proportional to their relative amounts in the original product of combustion; where $O_2$ and CO together may come to one and one-half per cent (1½%) though being restricted by the apparatus shown to below one per cent (1%) and where nitrogen compounds may be substantially completely eliminated or not allowed to exceed three thousandths per cent (.003%).

From the foregoing description taken in connection with the accompanying drawing, it will be apparent that this invention provides a particularly useful apparatus and method for the continuous removal of nitrogen oxides from combustion gases derived from any source. The resulting gases produced by this method are particularly useful as inert protective gases due to their noncorrosiveness.

What I claim as my invention is:

1. The method of producing a noncorrosive inert gas containing a major proportion of nitrogen from combustion gases containing traces of oxygen and nitrogen oxide which comprises, the successive steps of quickly oxidizing the nitrogen oxide content of the combustion gases by subjecting the same to high pressure of not less than one hundred and eighty pounds per square inch gauge for a period sufficient to oxidize the nitrogen oxide to nitrogen peroxide, washing the combustion gases to remove therefrom the nitrogen peroxide formed as a result of the oxidation step, and storing the resulting inert gas under pressure.

2. The method of producing a noncorrosive inert gas containing a major proportion of nitrogen which comprises: subjecting combustion gases containing substantially equal amounts of oxygen and nitrogen oxide to high pressure of not less than one hundred and eighty pounds per square inch gauge for a period sufficient so that the oxygen quickly unites with the nitrogen oxide of the combustion gases to produce water soluble nitrogen peroxide; washing the compressed gases to remove the water soluble nitrogen peroxide therefrom; and storing the resulting gas under pressure.

3. The method of producing a noncorrosive inert gas containing a major proportion of nitrogen which comprises: compressing combustion gases issuing from an internal combustion engine and having traces of oxygen and nitrogen oxide in substantially like amounts to a pressure in excess of that at which the gases issue from the internal combustion engine and not less than one hundred and eighty pounds per square inch gauge to thereby quickly effect a union between the oxygen and nitrogen oxide converting the same into nitrogen peroxide; washing said combustion gases containing nitrogen peroxide to remove the same from the combustion gases; and storing the resulting inert gas under pressure.

4. The method of producing a noncorrosive inert gas containing a major proportion of nitrogent which comprises: compressing combustion gases issuing from an internal combustion engine and having traces of oxygen and nitrogen oxide in substantially like amounts to a pressure in excess of that at which the gases issue from the internal combustion engine and not less than one hundred and eighty pounds per square inch gauge to thereby quickly effect a union between the oxygen and nitrogen oxide converting the same into nitrogen peroxide; washing said combustion gases containing nitrogen peroxide to remove the same from the combustion gases; passing the washed gases while under said high pressure through a moist filtering medium to eliminate odors therefrom and to remove any traces of nitrogen peroxide not eliminated by washing; and storing the resulting inert gas under pressure.

5. The method of producing a noncorrosive inert gas containing a major proportion of nitrogen which comprises: regulating the combustion of an inert gas producer so that the combustion gases issuing therefrom contain oxygen in quantities substantially equal to the small amount of nitrogen oxide normally contained in the gases; subjecting the combustion gases to pressure in excess of that at which the gases issue from the producer and not less than one hundred and eighty pounds per square inch gauge to effect rapid oxidation of the nitrogen oxide by the oxygen contained in the gas to substantially eliminate free oxygen and nitrogen oxide from the combustion gas to thereby form water soluble nitrogen peroxide as a result of such oxidation; washing the combustion gases containing the nitrogen peroxide to remove the nitrogen peroxide from the combustion gas; and storing the resultant inert gas under pressure.

6. The method of treating combustion gases continuously flowing from an inert gas producer which comprises: regulating the producer so that the combustion gases issuing therefrom contain amounts of oxygen substantially equal to the small amounts of nitrogen oxide normally present in the combustion gases; subjecting said combustion gases flowing from the producer to pressure in excess of that at which it issues from the producer and not less than one hundred and eighty pounds per square inch gauge to quickly form nitrogen peroxide compounds as a result of the combining of the oxygen and nitrogen oxide content of the combustion gas; cooling said combustion gases during said pressure treatment to retard the rate of flow thereof so as to insure sufficient time for the chemical union of substantially all the oxygen with the nitrogen oxide in the combustion gas; removing the nitrogen peroxide formed as a result of the compression and cooling steps by washing the gases, the resulting inert gas containing a major proportion of nitrogen; and storing the resulting inert gas under pressure.

WALTER J. WILLENBORG.